United States Patent [19]

Lee

[11] Patent Number: 5,731,367
[45] Date of Patent: Mar. 24, 1998

[54] INJECTION MOLDED PARTS HAVING IMPROVED SURFACE GLOSS

[75] Inventor: Bin Lee, Coraopolis, Pa.

[73] Assignee: Bayer Corporation, Pittsburgh, Pa.

[21] Appl. No.: 794,715

[22] Filed: Feb. 4, 1997

[51] Int. Cl.$^6$ .................................................. C08J 9/32
[52] U.S. Cl. .................... 523/219; 521/54; 523/218
[58] Field of Search .................. 521/54; 523/218, 523/219

[56] References Cited

U.S. PATENT DOCUMENTS

| | | | |
|---|---|---|---|
| 4,038,238 | 7/1977 | Cravens | 260/33.6 UB |
| 4,218,543 | 8/1980 | Weber et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,774,263 | 9/1988 | Weber et al. | 521/51 |
| 4,774,264 | 9/1988 | Weber et al. | 521/51 |
| 4,829,094 | 5/1989 | Melber et al. | 521/57 |
| 4,843,104 | 6/1989 | Melber et al. | 521/54 |
| 4,902,722 | 2/1990 | Melber | 521/54 |
| 4,916,173 | 4/1990 | Otloski et al. | 521/54 |
| 4,959,395 | 9/1990 | Janda | 521/54 |
| 5,041,472 | 8/1991 | Myer | 521/54 |
| 5,356,958 | 10/1994 | Matthews | 54/54 |
| 5,532,280 | 7/1996 | Allen et al. | 521/51 |
| 5,561,169 | 10/1996 | Allen et al. | 521/51 |

FOREIGN PATENT DOCUMENTS

| | | |
|---|---|---|
| 639614 | 2/1995 | European Pat. Off. . |
| 60-244511 | 12/1985 | Japan . |

OTHER PUBLICATIONS

F.W. Billmeyer, Jr., Textbook of Polymer Science, 3rd edition (John Wiley & Sons, 1984) (Month unavailable) page 250.

*Primary Examiner*—Morton Foelak
*Attorney, Agent, or Firm*—Joseph C. Gil; Richard E.L. Henderson

[57] ABSTRACT

This invention relates to a reaction injection molding process for preparing a molded product comprising reacting, at an isocyanate index of about 70 to about 130, (a) an organic polyisocyanate;

(b) one or more isocyanate-reactive compounds containing at least two isocyanate-reactive groups;

(c) about 0.5 to about 40% by weight, based on the weight of the molded product, of rigid microspheres, wherein at least 95% of said microspheres have a particle size range of about 10 μm to about 400 μm and a median diameter of at least 120 μm, (d) optionally, an inert gas dissolved in at least one of components (a) or (b) in an amount sufficient to produce a molded product having a density that is at least 1% less than the density of a molded product prepared in the same manner without using an inert gas but which is at least 0.2 g/cm$^3$;

(e) 0 to 45% by weight, based upon the weight of the molded product, of a reinforcing filler other than rigid microspheres; and (f) optionally, a blowing agent.

12 Claims, No Drawings

INJECTION MOLDED PARTS HAVING IMPROVED SURFACE GLOSS

BACKGROUND OF THE INVENTION

This invention relates to a process for preparing molded parts having improved surface gloss using rigid microspheres having specified particle sizes.

A variety of different molded polyurethane parts, particularly external automotive body parts, can be produced by the reaction injection molding ("RIM") process. This process involves filling a closed mold with highly reactive liquid starting components within a very short time, generally by using high output, high pressure dosing apparatus after the components have been mixed. The RIM process involves the intimate mixing of a polyisocyanate component and an isocyanate-reactive component, followed by the injection of this mixture into a mold for subsequent rapid curing. The polyisocyanate component is typically based on a liquid polyisocyanate. The isocyanate-reactive component contains a high molecular weight isocyanate-reactive component, typically a polyol and/or an amine polyether, and usually contains a chain extender containing amino and/or hydroxyl groups. U.S. Pat. No. 4,218,543 describes a RIM process currently being commercially used on a large scale. U.S. Pat. Nos. 4,433,067, 4,444,910, 4,530,941, 4,774,263, and 4,774,264 describe reaction injection molding processes for the production of polyurethane(urea) elastomers. As used herein, the term "polyurethanes" includes polyurethanes, polyureas, and polyurethane polyureas.

Expanded microspheres consisting of a synthetic thermoplastic resin shell that encapsulates a liquid blowing agent are known. See, e.g., U.S. Pat. Nos. 4,829,094, 4,843,104, and 4,902,722. Such microspheres have been suggested for use in plastics, coatings, and adhesives, and are described as having the ability to reduce density, to lower volume costs, to improve impact resistance, and to reduce shrinkage (see "Dualite" product information bulletin). In addition, such microspheres have been described as useful in low density rapid setting polyurethanes (see U.S. Pat. No. 4,038,238) and in non-polyurethane-based reaction injection molded polymers (see, e.g., U.S. Pat. No. 4,959,395). Finally, unexpanded microspheres have been described for use in polyurethane RIM. See Japanese Patent Publication 60-244511.

It has also been reported that rigid microspheres improve the release of molded parts from the mold, while also providing improved nucleation density and enhanced flow of the isocyanate-reactive component during the molding process. See European Patent Application 639,614 and U.S. application Ser. No. 08/163,057, as well as U.S. Pat. Nos. 5,532,280 and 5,561,169.

The known uses of microspheres, however, are still attended by various disadvantages, such as poor mold release or inferior surface appearance. Surface gloss, which is defined as the geometrically selective reflectance of a surface that provides its shiny or lustrous appearance, particularly in or near the specular direction (i.e., the direction at which a mirror would reflect light) (e.g., F. W. Billmeyer, Jr., *Textbook of Polymer Science*, 3rd edition (John Wiley & Sons, 1984), page 250), is particularly desirable. Therefore, it was an object of the present invention to prepare readily released urethane addition products having improved surface gloss by the RIM process using isocyanate-reactive components containing microspheres having very specific particle sizes.

SUMMARY OF THE INVENTION

This invention relates to a reaction injection molding process for preparing a molded product comprising reacting, at an isocyanate index of about 70 to about 130 (preferably 90 to 110), (a) an organic polyisocyanate;

(b) one or more isocyanate-reactive compounds containing at least two isocyanate-reactive groups;

(c) about 0.5 to about 40% by weight (preferably 2 to 10% by weight), based on the weight of the molded product, of rigid microspheres (preferably rigid inorganic microspheres), wherein at least 95% of said microspheres have a particle size range of about 10 µm to about 400 µm (preferably about 20 µm to about 230 µm) and a median diameter of at least 120 µm (preferably 125 µm to 140 µm), said microspheres preferably being used in admixture with component (b);

(d) optionally, an inert gas (preferably air, nitrogen gas, carbon dioxide, or mixtures thereof) dissolved in at least one of components (a) or (b) in an amount sufficient to produce a molded product having a density that is at least 1% (preferably at least 5%) less than the density of a molded product prepared in the same manner without using an inert gas but which is at least 0.2 g/cm³ (preferably 0.3 to 1.2 g/cm³, more preferably 0.8 to 1.1 g/cm³);

(e) 0 to 45% by weight (preferably 5 to 45% by weight and most preferably 15 to 40% by weight), based upon the weight of the molded product, of a reinforcing filler other than rigid microspheres; and (f) optionally, a blowing agent.

DETAILED DESCRIPTION OF THE INVENTION

Suitable rigid microspheres for use as component (c) according to the present invention can be hollow microspheres (also known as microballoons or microbubbles) or solid microspheres. When preparing low-density materials, for example, hollow spheres are generally preferred. However, regardless of whether the microspheres are hollow or solid, they should be heat resistant and essentially incompressible when subjected to elevated temperatures and pressure during the molding process. In a typical RIM process, compression strengths greater than about 12 MPa (preferably greater than 20 MPa) are generally suitable. With hollow microspheres, wall thickness is, of course, a selection factor.

Suitably rigid microspheres may be made of inorganic materials, such as glass, ceramic, and carbon, or rigid organic polymers, such as phenolic resins.

Suitable solid microspheres can be prepared by any of several methods known in the art. For example, rigid solid microspheres can be prepared by softening irregularly shaped particles just enough for then to flow into spheres under the influence of surface tension, by quenching a melt in a cooler medium, or by carrying out polymerizations in well-stirred suspensions at elevated temperature.

Hollow inorganic microspheres can be prepared by several known methods. For example, hollow glass spheres can be prepared by grinding and sizing soda-lime glass cullet to form particles that, in combination with blowing agents, are passed through a gas flame (ca. 1000° C.) to soften the glass and generates gases that expand the particles. See U.S. Pat. No. 3,365,315. Hollow glass spheres can also be prepared by spray-drying a sodium borosilicate solution containing a blowing agent to form a particulate material that is passed through a gas flame to form the spheres. See U.S. Pat. No. 2,978,339. Ceramic microspheres can be obtained as both solid and hollow microspheres as a normal aluminosilicate by-product of burning coal. In general, hollow ceramic microspheres are heavier than similarly sized glass microspheres. Although inorganic microspheres can be treated with a silane or titanate coupling agent to enhance adhesion with the matrix urethane polymer, the untreated particles generally exhibit sufficient adhesion to the polymer, making such treatments unnecessary. Commercially available hollow inorganic microspheres include ceramic FILLITE microspheres from Fillite and ceramic Z-Light Spheres and glass SCOTCHLITE Glass Bubbles from 3M Company. Commercially available glass microspheres typically contain about 72 wt. % $SiO_2$, 14 wt. % $Na_2O$, 10 wt. % CaO, 3 wt. % MgO, and 1 wt. % $Al_2O_3/K_2O/Li_2O$, whereas commercially available ceramic microspheres typically contain about 50–58 wt. % $SiO_2$, 25–30 wt. % $Al_2O_3$, 6–10 wt. % CaO, 1–4 wt. % $Na_2O/K_2O$, and 1–5 wt. % other oxides. E.g., J. F. Plummer, "Microspheres" in *Encyclopedia of Polymer Science and Technology*, Vol. 9 (John Wiley & Sons, Inc., 1987), page 788.

Solid microspheres of Organic polymers can be prepared using aqueous dispersions of suitable film-forming thermoset or thermoplastic materials. In the presence of a blowing agent, this method gives hollow microspheres.

Low density microspheres, especially hollow microspheres, are generally preferred, with those having densities ranging from 0.05 to 2.5 $g/cm^3$ being particularly preferred.

Commercially available rigid microspheres typically exhibit a range of sizes and typically have a diameter of between about 1 and about 350 µm. For the process of the present invention, however, at least 95% of the microspheres must have a particle size falling within a range of about 10 µm to about 400 µm (preferably about 20 µm to about 230 µm) and a median diameter of at least 120 µm (preferably 125 µm to 140 µm). Within these limits, the specific particle size selected is often dependent on the particular injection equipment and operating parameters (for example, nozzle diameter) used. FILLITE 300LF microspheres available from Fillite are particularly suitable.

The rigid microspheres can be added to either the isocyanate component or the isocyanate-reactive component, although addition to isocyanate-reactive component (b) is generally preferred. The microspheres are added in amounts such that the final products have a total microsphere content of about 0.5 to about 40% by weight (preferably 2 to 10% by weight). Products having density reductions in the range from 10 to 30% are readily obtained.

Although compressible microspheres, such as Dualite polymeric microspheres available from Pierce & Stevens Corporation, can be used in combination with the rigid microspheres of the invention, compressible microspheres are generally not preferred. If used at all, compressible microspheres are added in quantities such that the final products have a total compressible microsphere content of about 0.01 to about 10% by weight (preferably 0.5 to 2% by weight).

Suitable polyisocyanates for use as component (a) according to the present invention include aliphatic, cycloaliphatic, araliphatic, aromatic and heterocyclic, polyisocyanates which are known and described, for example, by W. Siefken in *Justus Liebigs Annalen der Chemie*, 562, pages 75–136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures thereof; 1-isocyanato-3,3,5-trimethyl-5-isocyanatomethylcyclohexane (isophorone diisocyanate or IPDI); 2,4- and 2,6-hexahydrotoluene diisocyanate and mixtures thereof; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-toluene diisocyanate and mixtures thereof; diphenylmethane 2,4'- and/or 4,4'-diisocyanate; naphthylene 1,5-diisocyanate; triphenylmethane-4,4',4"-triisocyanate; and polyphenyl polymethylene polyisocyanates of the type obtained by condensing aniline with formaldehyde, followed by condensation.

It is preferable to use readily available polyisocyanates such as 2,4- and 2,6-toluene diisocyanate and mixtures of such isomers; polyphenyl polymethylene polyisocyanates of the type obtained by condensing aniline with formaldehyde, followed by phosgenation; and polyisocyanates containing carbodiimide groups, urethane groups, allophanate groups, isocyanurate groups, urea groups, or biuret groups. Particularly preferred are the liquid derivatives of 4,4'-diphenylmethane diisocyanate (MDI) which may be liquefied by introducing carbodiimide groups, blending with 2,4'-diphenylmethane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as polyisocyanate component (a) are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Suitable isocyanate-reactive compounds (b) include those containing at least two isocyanate-reactive groups. Such compounds can be divided into two groups: high molecular weight compounds having molecular weights of 400 to about 10,000 and low molecular weight compounds (i.e., chain extenders) having molecular weights of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

High molecular weight polyethers suitable for use in accordance with the invention are known and may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water, alcohols, or amine. Examples of alcohols and amines include the low molecular weight chain extenders set forth hereinafter, 4,4'-dihydroxydiphenylpropane, sucrose, aniline, ammonia, ethanolamine, and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383, 351, 3,304,273, 3,523,093, and 3,110,695; and German Patent 1,152,536), are also suitable, as are polybutadienes containing OH groups.

Polyether polyols which contain high molecular weight polyadducts or polycondensates in finely dispersed form or in solution can also be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Examples of suitable high molecular weight polyesters include the reaction products of polyhydric, preferably dihydric alcohols (optionally in the presence of trihydric alcohols), with polyvalent (preferably divalent) carboxylic acids. Instead of using the free carboxylic acids, it is also possible to use corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted (for example, by halogen atoms). The polycarboxylic acids and polyols used to prepare the polyesters are known and described, for example, in U.S. Pat. Nos. 4,098, 731 and 3,726,952, herein incorporated by reference in their entirety. Suitable polythioethers, polyacetals, polycarbonates, and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders and Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-H öchtlen, Carl Hanser Verlag, Munich, 1966; pages 45–71.

Suitable aminopolyethers that may be used according to the present invention as high molecular weight compounds (the molecular weight always being the number average molecular weight which may be calculated from the functionality and the content of isocyanate-reactive groups) are those wherein at least about 30 and preferably about 60 to 100 equivalent percent of the isocyanate-reactive groups are primary and/or secondary (preferably primary) aromatically or aliphatically (preferably aromatically) bound amino groups and the remainder are primary and/or secondary aliphatically bound hydroxyl groups. In these compounds, the terminal residues carrying the amino groups may also be attached to the polyether chain by urethane or ester groups. Such "aminopolyethers" are prepared by known methods. For example, polyhydroxypolyethers such as polypropylene glycol ethers may be aminated by reaction with ammonia in the presence of Raney nickel and hydrogen. Belgian Patent 634,741. U.S. Pat. No. 3,654,370 describes the production of polyoxyalkylene polyamines by reaction of the corresponding polyol with ammonia and hydrogen in the presence of a nickel, copper, or chromium catalyst. German Patent 1,193, 671 describes the production of polyethers containing terminal amino groups by hydrogenation of cyano-ethylated polyoxypropylene ethers. Other methods for the production of polyoxyalkylene (polyether) amines are described in U.S. Pat. Nos. 3,155,728 and 3,236,895 and in French Patent 1,551,605. The production of polyethers containing terminal secondary amino groups is described, for example, in French Patent 1,466,708.

Polyhydroxypolyethers of relatively high molecular weight can be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428, and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines, or ketimines containing hydroxyl groups and subsequent hydrolysis.

It is preferred to use amino polyethers obtained by hydrolysis of compounds containing terminal isocyanate groups, for example, in accordance with German Offenlegungsschrift 2,948,419 or U.S. Pat. No. 4,515,923, herein incorporated by reference in its entirety. In this process, polyethers most preferably containing 2 to 4 hydroxyl groups are allowed to react with polyisocyanates to form NCO prepolymers and, in a second step, the isocyanate groups are converted by hydrolysis into amino groups.

Aminopolyethers used in accordance with the invention are often mixtures of the compounds mentioned by way of example and (on a statistical average) most preferably contain 2 to 4 terminal isocyanate-reactive groups. In the process according to the invention, the aminopolyethers may be used in admixture with polyhydroxypolyethers free from amino groups.

The high molecular weight compounds are used in admixture with up to about 95% by weight (preferably up to about 50% by weight, more preferably about 8 to 30% by weight, and most preferably about 12 to 26% by weight), based on the total quantity of the high molecular weight compounds, of the low molecular weight chain extenders. Examples of suitable hydroxyl group-containing chain extenders include ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, and trimethylolpropane.

Other suitable chain extenders include aromatic polyamines (preferably diamines) having molecular weights of less than 400, especially the sterically hindered aromatic polyamines (preferably diamines) having molecular weights of less than 400, especially the sterically hindered aromatic diamines which contain at least one linear or branched alkyl substituent in the ortho-position to the first amino group and at least one (preferably two) linear or branched alkyl substituents containing from 1 to 4 (preferably 1 to 3) carbon atoms in the ortho-position to a second amino group. These aromatic diamines include 1-methyl-3,5-diethyl-2,4-diaminobenzene, 1-methyl-3,5-diethyl-2,6-diaminobenzene, 1,3,5-trimethyl-2,4-diaminobenzene, 1,3, 5-triethyl-2,4-diaminobenzene, 3,5,3', 5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,5-diethyl-5,5'-diisopropyl-4,4'-diaminodiphenylmethane, 1-methyl-2,6-diamino-3-isopropylbenzene, and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15 (preferably about 65:35 to 80:20).

Aromatic polyamines can also be used in admixture with the sterically hindered chain extenders and include, for example, 2,4- and 2,6-diaminotoluene, 2,4'- and/or 4,4'-diaminodiphenylmethane, 1,2- and 1,4-phenylenediamine, naphthalene-1,5-diamine and triphenylmethane-4,4',4"-triamine. The difunctional and polyfunctional aromatic amine compounds may also exclusively or partly contain secondary amino groups such as 4,4'-di(methylamino) diphenylmethane or 1-methyl-2-methylamino-4-aminobenzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

In a preferred embodiment of the invention, which is particularly suitable for preparing low-density products, an inert gas (d) is introduced into one or more of the reactive components (preferably into isocyanate-reactive component (b)) using techniques known in the art. As used herein, the term "inert gas" refers to gaseous materials that are essentially unreactive under the conditions used in the process of the invention. Examples of suitable inert gases include air, nitrogen, argon, carbon dioxide, or mixtures thereof.

When preparing the preferred low density products, the inert gas is introduced in sufficient quantity to give products having a density that is at least 1% (preferably at least 5%) less than the density of an analogous molded product prepared in the same manner without using an inert gas but which is at least 0.2 g/cm$^3$ (preferably 0.3 to 1.2 g/cm$^3$, more preferably 0.8 to 1.1 g/cm$^3$).

The inert gas is preferably introduced using commercial equipment, such as Diffuser Stone-KIMEX mixers and venturi type mixers. The presently preferred device is a Hennecke Aeromat-GU which is described in Hennecke Trade Bulletin #41 and in a 1991 article entitled "Consistent Distribution of Finely Dispersed Gases in Polyol Streams", Proksa et al, in *Polyurethanes World Congress* 1991. Inert gas is customarily introduced into the system in an amount in excess of the amount necessary to saturate the particular component at a feed tank pressure of about 0.21 to about 0.35N/mm$^2$. As is known in the art, material flows from the feed tank through a transfer pump (which increases the pressure of the particular component) through a metering pump to the mixhead. Discharge pressures of the transfer pump are generally in the range of 0.35 to 0.7N/mm$^2$, while discharge pressures of the metering pump are generally in the range of 14 to 21N/mm$^2$. The amount of the gas in the system is generally monitored using commercial measuring equipment which responds to changes in specific gravity of the liquid components. One such device is the Dynatrol (manufactured by Automation Products), which permits the effective control of the gas content by monitoring any changes in the specific gravity of the liquid component.

When preparing low density products, factors that are important to achieving high quality product include enhanced flow characteristics and reduced nucleation density of the isocyanate-reactive component. Good flow properties are important because relatively smaller quantities of reactive materials are required for low density products. Reduced nucleation density is directly related to an increased amount of inert gas dissolved or dispersed in the isocyanate-reactive component and ultimately to a lower density product. Rigid microspheres have been found to be particularly useful in enhancing both the flow characteristics and the nucleation density of the isocyanate-reactive component, as well as reducing the time required to achieve a given nucleation density. As a result, the use of rigid microspheres according to the invention in conjunction with an inert gas produces molded parts having significantly reduced density and improved surface gloss while at the same time improving demold characteristics (such as mold release, green strength, and hot tear strength) without adversely affecting physical properties. The use of hollow rather than solid microspheres provides an even further reduction in density, while still providing improved physical properties and demold characteristics, and is thus particularly preferred.

Suitable reinforcing fillers (e) other than rigid microspheres falling within the definition of component (c) can be used to reduce contraction of the molded product upon cooling, as well as to adjust tensile modulus and flex modulus, and are known in the art. Suitable inorganic fillers include glass in the form of fibers or flakes, mica, wollastonite, carbon black, talc, calcium carbonate, and carbon fibers. Organic fillers, although less preferred, can also be used.

Optional blowing agents (f), which are particularly useful when preparing low-density products, include water and/or readily volatile organic or inorganic substances in quantities amounting to about 0.1 to 10 parts by weight (preferably 0.5 to 5 parts by weight) per 100 parts of the isocyanate-reactive component. Suitable organic blowing agents include acetone, ethyl acetate, halogen-substituted alkanes (such as methylene chloride, chloroform, ethylidene chloride, vinylidene chloride, monofluorotrichloromethane, chlorodifluoromethane, and dichlorodifluoromethane), butane, hexane, heptane, or diethyl ether. Suitable inorganic blowing agents include air, carbon dioxide, and nitrous oxide. A blowing effect may also be obtained by adding compounds which decompose at temperatures above room temperature and thereby give off gases such as nitrogen (for example, azo compounds such as azoisobutyronitrile). Other examples of blowing agents and information on their use can be found in *Kunststoff-Handbuch*, Volume VII, Vieweg-H öchtlen, Carl-Hanser-Verlag, Munich, 1966, for example, on pages 108–109, 453–455, and 507–510.

Other additives which may be used in the present invention include catalysts, especially tin(II) salts of carboxylic acids, dialkyltin salts of carboxylic acids, dialkyltin mercaptides, dialkyltin dithioesters, and tertiary amines. Preferred among these catalysts are dibutyltin dilaurate and 1,4-diazabicyclo[2,2,2]octane (triethylene diamine), especially mixtures of these catalysts. The catalysts are generally used in amounts of about 0.01 to 10% (preferably about 0.05 to 2%), based on the weight of the high molecular weight component.

It is also possible to use surface-active additives such as emulsifiers and foam stabilizers. Examples include siloxanes, N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxyethyl imidazole derivative of oleic acid, N-stearyl propylene diamine, and the sodium salts of castor oil sulfonates or of fatty acids. Alkali metal or ammonium salts of sulfonic acid, such as dodecyl-benzenesulfonic acid or dinaphthylmethanesulfonic acid, and fatty acids may also be used as surface-active additives. Particularly suitable surface-active compounds include polyether siloxanes of the type generally known for use in the polyurethane art, such as water-soluble polyether siloxanes. The structure of these siloxanes is generally such that a copolymer of ethylene oxide and propylene oxide is attached to a polydimethylsiloxane functionality. Methods of manufacturing preferred siloxanes are described in U.S. Pat. No. 4,906,721, the disclosure of which is herein incorporated by reference.

It is also possible to use mold release agents, which are compounds added to the reactive components of the isocyanate addition reaction, usually the isocyanate-reactive component, to assist in the removal of a polyurethane product from a mold. Suitable mold release agents for the present invention include those based at least in part on fatty acid esters (e.g., U.S. Pat. Nos. 3,726,952, 3,925,527, 4,058, 492, 4,098,731, 4,201,847, 4,254,228, 4,868,224, and 4,954, 537 and British Patent 1,365,215); metal and/or amine salts of carboxylic acids, amido carboxylic acids, phosphorus-containing acids, or boron-containing acids (e.g., U.S. Pat. Nos. 4,519,965, 4,581,386, 4,585,803, 4,876,019, 4,895, 879, and 5,135,962); polysiloxanes (e.g., U.S. Pat. No. 4,504,313); amidines (e.g., U.S. Pat. Nos. 4,764,540, 4,789, 688, and 4,847,307); resins prepared by the reaction of isocyanate prepolymers and a polyamine-polyimine component (e.g., U.S. Pat. No. 5,198,508); and neutralized esters prepared from certain amine-started tetrahydroxy compounds described in U.S. Pat. No. 5,208,268. Particularly preferred mold release agents contain zinc stearate.

In addition to the reinforcement fillers, catalysts, surface-active agents, and mold release agents mentioned above, other additives that can be used in the molding compositions of the present invention include known fillers of other types, cell regulators, flame retarding agents, plasticizers, and dyes of the types generally known in the art.

The compositions according to the present invention are especially suited for processing by the RIM process. When using the RIM process, the components can be mixed simultaneously or in steps. In general, two separate streams are intimately mixed and subsequently injected into a suitable mold, although it is possible to use more than two streams. The first stream generally contains only the polyisocyanate component, whereas the second stream contains the isocyanate-reactive components (including any chain extenders) and the rigid microspheres, as well as any inert gas, fillers other than rigid microspheres, and additives that are to be included. The non-reactive components are often pre-mixed before being added to the reactive components.

The quantity of reactants used in the process according to the present invention is preferably calculated so that the reaction mixture has an isocyanate index of 70 to 130 (preferably 90 to 110). By "isocyanate index" is meant the quotient of the number of isocyanate groups and number of groups which are reactive with isocyanates, multiplied by 100.

A starting temperature of 10° C. to 80° C. (preferably 20° C. to 60° C.) is generally chosen for the mixture introduced into the mold. The temperature of the mold itself is generally 40° C. to 100° C. (preferably 50° C. to 70° C.). After completion of the reaction and molding process, the resultant product is removed from the mold.

The moldings obtainable by the process according to the present invention are particularly suitable for the manufacture of a variety of high gloss polyurethane products. For example, in a preferred embodiment of the invention, low density products such as flexible car bumpers and car body elements can be produced. With suitable variation of the starting components, particularly by using a relatively low proportion of the active diamine, it is also possible to produce materials which have good abrasion resistance and high mechanical strength, such as flexible polyurethane shoe soles, seating foams, and structural door panels.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

The following microspheres were used in the Examples. Particle size distributions for the microspheres were determined by the light scattering method using a Coulter LS Particle Size Analyzer.

Microspheres according to the invention:

(M1) Hollow ceramic microspheres having a mean particle size of 131.5 µm and a median particle size of 131.8 µm (mean/median ratio of 0.998), a mode of 152.5 µm, and a particle size range (95% confidence limits) of 25.1 to 238 µm, with a standard deviation of 54.3 µm, skewness of −0.0293 (left skewed), and kurtosis of −0.337 (platykurtic); and a density of about 0.6 to about 0.8 g/cm$^3$ (a refined grade of FILLITE 300 (see comparison MC1) from which fines have been partly removed and the particle size distribution thereby altered that is available as FILLITE 300LF from Fillite)

Comparison microspheres:

(MC1) Hollow ceramic microspheres having a mean particle size of 107.7 µm and a median particle size of 102.7 µm (mean/median ratio of 1.049), a mode of 105.9 µm, and a particle size range (95% confidence limits) of 20.9 to 195 µm, with a standard deviation of 44.3 µm, skewness of 0.505 (right skewed), and kurtosis of 0.403 (leptokurtic); and a density of about 0.6 to about 0.8 g/cm$^3$ (available as FILLITE 300 from Fillite)

(MC2) Hollow ceramic microspheres having a mean particle size of 82.16 µm and a median particle size of 81.81 µm (mean/median ratio of 1.004), a mode of 88.29 µm, and a particle size range (95% confidence limits) of 19.5 to 145 µm, with a standard deviation of 32 µm, skewness of −0.0897 (left skewed), and kurtosis of −0.126 (platykurtic); and a density of about 0.6 to about 0.8 g/cm$^3$ (available as FILLITE 150 from Fillite)

(MC3) Hollow ceramic microspheres having a mean particle size of 109.3 µm and a median particle size of 107.8 µm (mean/median ratio of 1.014), a mode of 116.0 µm, and a particle size range (95% confidence limits) of 57.1 to 161 µm, with a standard deviation of 26.6 µm, skewness of 0.242 (right skewed), and kurtosis of −0.415 (platykurtic); and a density of about 0.6 to about 0.8 g/cm$^3$ (available as Z-Light Spheres W1000 from 3M Company)

(MC4) Hollow ceramic microspheres having a mean particle size of 119.5 µm and a median particle size of 120.2 µm (mean/median ratio of 0.995), a mode of 139.2 µm, and a particle size range (95% confidence limits) of 37.1 to 202 µm, with a standard deviation of 42 µm, skewness of −0.145 (left skewed), and kurtosis of −0.163 (platykurtic); and a density of about 0.6 to about 0.8 g/cm$^3$ (available as Z-Light Spheres W1100 from 3M Company)

(MC5) Hollow ceramic microspheres having a mean particle size of 120.4 μm and a median particle size of 110.0 μm (mean/median ratio of 1.095), a mode of 116.0 μm, and a particle size range (95% confidence limits) of 10.6 to 230 μm, with a standard deviation of 56 μm, skewness of 1.18 (right skewed), and kurtosis of 2.05 (leptokurtic); and a density of about 0.6 to about 0.8 g/cm$^3$ (available as Z-Light Spheres W1300 from 3M Company)

Isocyanate-reactive components were prepared using 74.25 parts of a trifunctional polyether polyol started on glycerin starter (molecular weight of 6010 and a weight ratio of propylene oxide units to ethylene oxide units of about 5:1), 17 parts of diethyltoluene diamine ("DETDA"), 7 parts of a zinc stearate concentrate consisting of 4 parts of a 400 molecular weight diamine (JEFFAMINE D-400, available from Texaco), 2 parts of zinc stearate, and 1 part of a 356 molecular weight tetrafunctional polyol (prepared from ethylene diamine and propylene oxide). Also added to the blend was 0.1 parts of triethylene diamine (available as DABCO 33-LV from Air Products & Chemicals, Inc.), 0.05 parts of dibutyltin dilaurate (available as DABCO T12 from Air Products & Chemicals, Inc.), 0.1 parts of dimethyltin dilaurate (available as Witco UL-28 from Witco Corporation), and 0.5 parts of a polysiloxane surfactant available as Goldschmidt B-8418.

Polyol slurries were prepared as would normally be used in the molding of a urethane reinforced RIM product using appropriate quantities of the isocyanate and isocyanate-reactive components to maintain an isocyanate index of 105 in all examples. To the above polyol blends were added 4.4% by weight of microspheres and 8% by weight of wollastonite fiber having a length of 50 μm and diameter of 3.3 μm (for an aspect ratio of 15.2) and a density of 2.9 g/cm$^3$ (available as WOLLASTOKUP G20491 from Nyco).

Each polyol slurry was charged to the polyol run tank of a Cincinnati Milacron CM-125 machine. The slurry was nucleated via a hollow-shaft high rpm nucleator based on the use of cavitation to introduce nitrogen. Each nucleated slurry was then combined with a tripropylene glycol-modified polymethylene poly(phenyl isocyanate) having an NCO content of 22.8% by weight (available as MONDUR PF from Bayer Corporation) at an isocyanate index of 105. Except for the comparison Examples 5 and 6, urethane parts were molded on a Cincinnati Milacron CM-125 RIM machine using a steel mold (P-2 steel) having the dimensions 4.5 mm×64 cm×92 cm. The temperature of the mold was maintained at 68° C., the temperature of the polyol slurry was maintained at 52° to 57° C., and the temperature of the isocyanate was maintained at 43° to 46° C. The mixing pressures were 11.2N/mm$^2$ for each component. Physical properties of the resultant urethane plaques are shown in Table 2. Comparison Examples 5 and 6 were carried out using an automotive part mold and thus physical properties other than surface appearance were not determined.

Surface gloss was determined using samples that had been washed with aqueous phosphoric acid solutions to remove residual solids, mold release agent, and other surface contaminants and then dried for one hour at 125° C. before testing. Each sample was illuminated at an angle of about 60° C. and observed at the angle of reflectance (i.e., an angle of about 60° C. when facing toward the direction of the illumination). A surface was characterized as "shiny" if the intensity of the light reflected from the surface was high and as "dull" if little or no reflection of light was observed (i.e., if light was essentially only scattered).

TABLE

Microsphere content and physical properties for products of Examples 1–6.

| | Example | | | | | |
|---|---|---|---|---|---|---|
| | 1 | 2 (comp) | 3 (comp) | 4 (comp) | 5 (comp) | 6 (comp) |
| Microsphere | M1 | MC1 | MC2 | MC3 | MC4 | MC5 |
| Mean particle size (μm) | 131.5 | 107.7 | 82.16 | 109.3 | 119.5 | 120.4 |
| Median particle size (μm) | 131.8 | 102.7 | 81.81 | 107.8 | 120.2 | 110.0 |
| Surface appearance | Glossy | Dull | Dull | Dull | Dull | Dull |
| Density (g/cm$^3$) | 0.94 | 0.92 | 0.96 | 0.95 | — | — |
| Elongation (%) | 137 | 126 | 143 | 136 | — | — |
| Tensile strength (MPa) | 12.1 | 11.8 | 12.5 | 12.4 | — | — |
| Tear strength (N/mm) | 49.1 | 50.9 | 53.0 | 51.9 | — | — |
| Flex modulus (MPa) | 227 | 240 | 243 | 235 | — | — |
| Heat sag (mm) | | | | | | |
| Perpendicular | 14.8 | 12 | 10.8 | 10.2 | — | — |
| Parallel | 10.7 | 11 | 8.2 | 8.5 | — | — |
| Impact (Joules) | | | | | | |
| 23° C. | 17.5 | 21.2 | 17.5 | 17.7 | — | — |
| −18° C. | 13.1 | 11.7 | 8.3 | 7.3 | — | — |
| −30° C. | 4.4 | 5.8 | 4.5 | 4.6 | — | — |

What is claimed is:

1. A reaction injection molding process for preparing a molded product having a glossy surface comprising reacting, at an isocyanate index of 70 to 130, (a) an organic polyisocyanate;

(b) one or more isocyanate-reactive compounds containing at least two isocyanate-reactive groups;

(c) 0.5 to 40% by weight, based on the weight of the molded product, of rigid microspheres, wherein at least 95% of said microspheres have a particle size range of about 10 μm to about 400 μm and a median diameter of 125 μm to 140 μm;

(d) optionally, an inert gas dissolved in at least one of components (a) or (b) in an amount sufficient to produce a molded product having a density that is at least 1% less than the density of a molded product prepared in the same manner without using an inert gas but which is at least 0.2 g/cm$^3$;

(e) 0 to 45% by weight, based upon the weight of the molded product, of a reinforcing filler other than rigid microspheres; and (f) optionally, a blowing agent, thereby forming a molded product having a glossy surface.

2. A process according to claim 1 wherein 2 to 10% by weight, based on the weight of the molded product, of rigid microspheres is used.

3. A process according to claim 1 wherein the rigid microspheres are rigid inorganic microspheres.

4. A process according to claim 1 wherein at least 95% of the rigid microspheres have a particle size range of about 20 μm to about 230 μm.

5. A process according to claim 1 wherein the microspheres are used in admixture with component (b).

6. A process according to claim 1 wherein the inert gas is used in an amount sufficient to produce a molded product having a density that is from 0.3 to 1.2 g/cm$^3$ but is at least 5% less than the density of a molded product prepared in the same manner without using an inert gas.

7. A process according to claim 1 wherein the inert gas is used in an amount sufficient to produce a molded product having a density that is from 0.8 to 1.1 g/cm$^3$ but is at least 5% less than the density of a molded product prepared in the same manner without using an inert gas.

8. A process according to claim 1 wherein the inert gas is air, nitrogen gas, carbon dioxide, or a mixture thereof.

9. A process according to claim 1 wherein 5 to 45% by weight, based upon the weight of the molded product, of a reinforcing filler other than rigid microspheres is used.

10. A process according to claim 1 wherein 15 to 40% by weight, based upon the weight of the molded product, of a reinforcing filler other than rigid microspheres is used.

11. A process according to claim 1 wherein water and/or a volatile organic substance is used as blowing agent (f).

12. A molded product prepared by the process of claim 1.

* * * * *